UNITED STATES PATENT OFFICE.

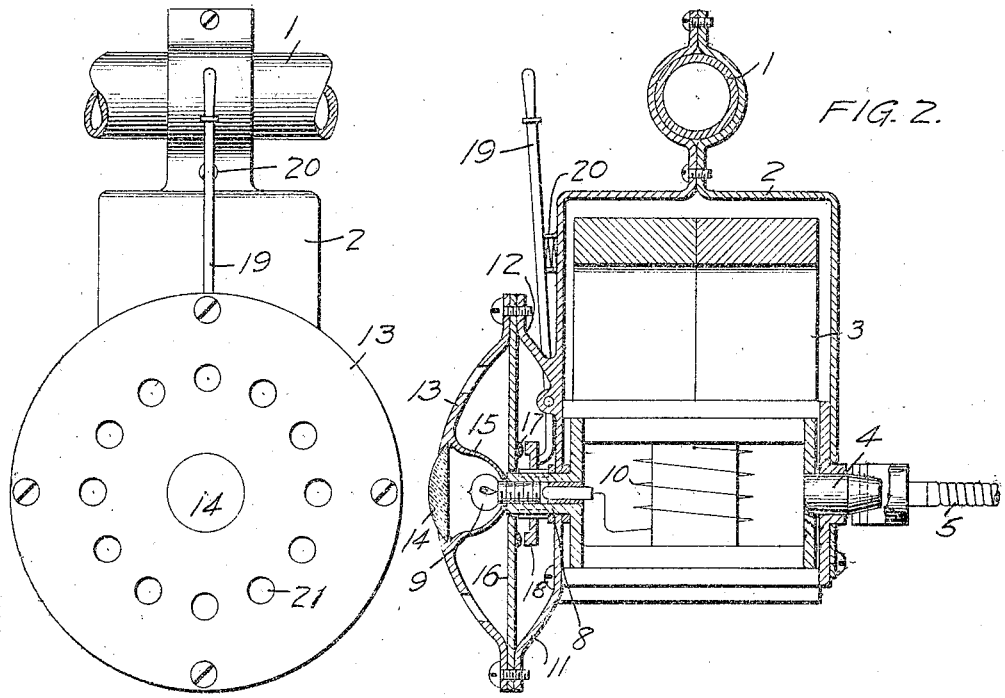
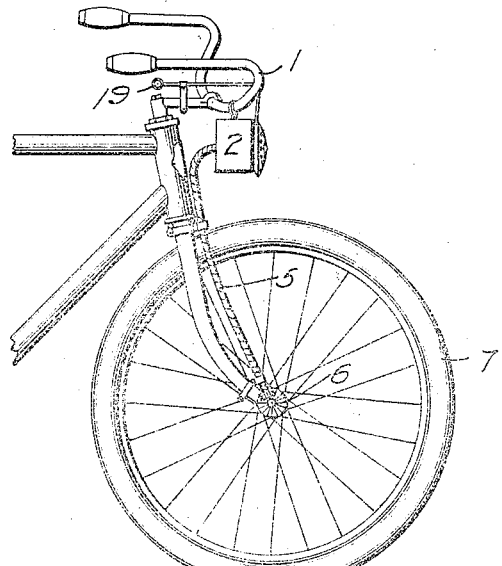

HARRY RANDOLPH VAN DEVENTER, OF SUMTER, SOUTH CAROLINA, ASSIGNOR TO SPLITDORF ELECTRICAL COMPANY, OF NEWARK, NEW JERSEY, A CORPORATION OF NEW JERSEY.

COMBINATION GENERATOR, LIGHT, AND HORN.

1,325,425.     Specification of Letters Patent.     Patented Dec. 16, 1919.

Application filed May 25, 1916. Serial No. 99,856.

*To all whom it may concern:*

Be it known that I, HARRY R. VAN DEVENTER, a citizen of the United States, residing at Sumter, in the county of Sumter and State of South Carolina, have invented certain new and useful Improvements in Combination Generators, Lights, and Horns, of which the following is a specification, reference being had to the accompanying drawing.

My invention relates to a combination generator, lamp, and signaling device.

It is customary on motor vehicles such as automobiles and motorcycles to use an electric head light, a generator for supplying current thereto, and a warning signal such as a horn. Such a combination would also be of value in connection with a bicycle, and the objects of my invention are to arrange the generator, lamp, and horn, in a single compact structure, thereby eliminating the usual circuit wires heretofore necessary when the generator and lamp are separate from each other.

A further object is to simplify the lamp casing by making it a part of the generator frame work; and a further object is to combine the horn with the said casing, and to provide means for mechanically actuating the diaphragm of the horn for the purpose of producing a signal.

While the accompanying drawings show the complete combination comprising the generator, the lamp and the horn, it will be obvious that the parts constituting the horn mechanism may be dispensed with, without however departing from the invention as hereinafter claimed, and that the lamp may be separately mounted from the generator without departing from some of the appended claims.

In the accompanying drawings in which like figures of reference denote the same parts wherever they are shown, Figure 1, is a front view of a device embodying my invention; Fig. 2, a view partly in section of the same, and Fig. 3, a view illustrating the application of the device to an ordinary bicycle.

The numeral 1 denotes the frame work or handle bars of the vehicle to which the device is attached, and 2 denotes an inclosing case adapted to protect the generator 3 and other parts. The generator is provided with a suitable driving shaft 4 which may be driven in any suitable manner as by the well known flexible shaft 5 and gear 6 connected to some moving part of the vehicle such as the wheel 7 of the bicycle shown in Fig. 3.

Driving shaft 4 operates the armature of the dynamo which may be of any suitable type. Mounted in a stub shaft 8 as shown is the lamp 9. The arrangement whereby this lamp is connected directly to the winding 10 and is movable with the rotating part of said generator is already known so I do not describe same here, it being clearly understood however that the lamp 9 rotates with the stub shaft 8 and is therefore always directly in connection with the winding 10, all brushes and other moving connections being eliminated.

In front of the lamp 9 part of the casing 2 is formed as shown at 11 and 12 or in any other suitable manner so as to support the front plate 13 in which is suitably mounted a bull's eye lens or glass 14. Back of this bull's eye may be placed a suitable reflector 15.

The foregoing structure as described constitutes a complete generating and lighting unit - self - contained, and adapted to be mounted upon a vehicle and driven thereby.

I will now proceed to describe how a signaling device may be incorporated in the above generator and lamp.

Suitably mounted upon the generator casing as just described, as for instance on the projecting portions 11 and 12 thereof, I mount the diaphragm 16 which has a central aperture large enough to clear the projecting stub shaft 8 and the lamp 9. Upon this diaphragm is riveted a series of projecting spots indicated at 17.

The stub shaft 8 is splined, or equipped with one or more keys, and slidably mounted thereon is the toothed wheel 18, which, by means of lever 19 may be moved in or out of engagement with spots 17. It will be observed that as the stub shaft 8 rotates the wheel 18 moves therewith and that upon the lever 19 being moved, the teeth in the wheel 18 will be brought into engagement with the spots 17 and a sound produced.

The lever 19 may be of any suitable shape such as shown in Fig. 3, so that it may be readily grasped, and any suitable means such as the spring 20 may be employed to hold the lever and its associated wheel normally out of engagement with the diaphragm.

The front casing 13 is apertured as indicated by the circular row of holes 21, Fig. 1, to permit the egress of the sound from the diaphragm 16.

It will be noted that the reflector for the lamp and the diaphragm of the signaling unit are all housed within a single casing, and it should be understood that, from certain aspects, the invention is not limited to the use of the dynamo directly supporting the lamp or housed within the same casing with the lamp and the diaphragm of the signaling device.

And while I here disclose one practical arrangement of the combination of parts constituting my invention, it will be understood that I do not limit myself to the precise structure herein disclosed, as it is obvious to those skilled in the art that many modifications may be made in the arrangement of the various parts and their relation to each other, without departing from the spirit of the invention as herein claimed by me.

I claim:—

1. A generating, lighting and signaling unit comprising a dynamo having a fixed part and a movable generating part, means for driving the movable part, a winding on said dynamo, a lamp mechanically connected with the movable part and moving therewith and electrically connected with said winding, and a sound producing device including a mechanically actuated diaphragm mounted upon said dynamo and adapted to be operated by the movable part thereof.

2. A generating, lighting and signaling unit comprising a dynamo having a movable part carrying a generating coil, means for driving said part, a lamp carried thereby and electrically connected to said coil, and a sound producing device including a mechanically actuated diaphragm mounted upon said dynamo and adapted to be actuated from said movable part carrying a generating coil.

3. A generating, lighting and signaling unit comprising a dynamo, a lamp connected to said dynamo, a shaft for the dynamo, means for driving said shaft, a diaphragm having an annular opening through which said shaft extends, and means for vibrating said diaphragm.

4. A generating, lighting and signaling unit comprising a dynamo, a shaft therefor, means for driving said shaft, a lamp electrically connected to said dynamo, a sound producing device including a diaphragm having an opening, said diaphragm being positioned about said shaft, said lamp projecting from said opening on the diaphragm, and means for vibrating said diaphragm.

5. A generating, lighting and signaling unit comprising a dynamo shaft therefor, a diaphragm adjacent said shaft, means on the shaft adapted to engage and vibrate said diaphragm, means for moving said first-mentioned means in and out of engagement with said diaphragm, and a common casing for all of said parts, whereby the same are supported in operative relation to each other.

6. A generating, lighting and signaling unit comprising a dynamo, an electric lamp connected therewith, a sound producing device supported by said dynamo a common casing surrounding and inclosing said dynamo, lamp and sound producing device, and common means for actuating said dynamo and said sound producing device, substantially as described.

7. The combination of a supporting casing, a reflector carried by said casing, a dynamo carried by said casing and having a generating armature, a lamp carried by the armature and located in front of said reflector, a signaling diaphragm located between the lamp and the armature and having an opening through which the lamp is supported by the armature, means carried by the armature for vibrating said diaphragm, and means for driving the dynamo.

In testimony whereof I hereunto affix my signature.

HARRY RANDOLPH VAN DEVENTER.